United States Patent

[11] 3,542,334

[72] Inventor Domer Scaramucci
3245 S. Hattie, Oklahoma City, Okla. 73129
[21] Appl. No. 790,127
[22] Filed Jan. 9, 1969
[45] Patented Nov. 24, 1970

[54] HIGH PRESSURE VALVE ASSEMBLY
23 Claims, 2 Drawing Figs.
[52] U.S. Cl. ..................................................... 251/152
[51] Int. Cl. ..................................................... F16k 5/06
[50] Field of Search ........................................... 251/151, 152, 148

[56] References Cited
UNITED STATES PATENTS
2,017,383 10/1935 Winterson et al............. 251/148X
3,165,292 1/1965 Dumm......................... 251/148

*Primary Examiner*—M. Cary Nelson
*Assistant Examiner*—Michael O. Sturm
*Attorney*—Dunlap, Laney, Hessin and Dougherty ABSTRACT: A valve assembly generally disposed between a pair of connectors and held in an assembled relationship therebetween by a plurality of bolts which extend through a pair of separate flange rings, wherein the flange rings and connectors are constructed such that the flange rings may swivel or tilt with respect to the respective connector, and thus compensate for the uneven tightening of the bolts and therefore the resulting uneven tension.

Patented Nov. 24, 1970

INVENTOR.
DOMER SCARAMUCCI
BY
Dunlap, Laney, Hessin & Dougherty
ATTORNEYS

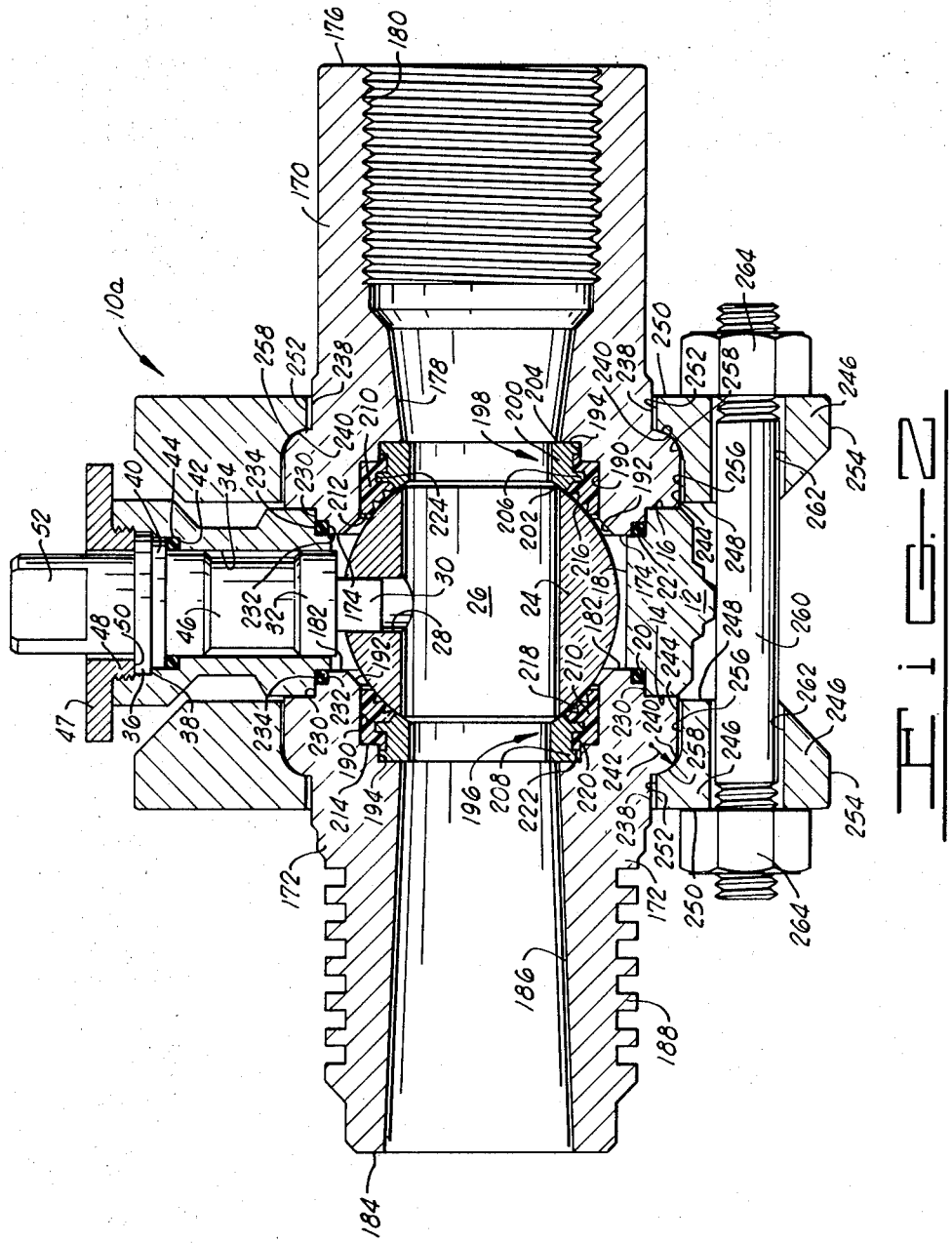

3,542,334

HIGH PRESSURE VALVE ASSEMBLY

BACKGROUND OF THE INVENTION

1. Field of the Invention

This invention relates generally to improvements in valves, and more particularly, but not by way of limitation, to improved connection means for a valve disposed generally between a pair of oppositely disposed connecters 2. Description of the Prior Art In the past, where valve assemblies were to be used between a pair of oppositely disposed connecter, each connecter generally included a flange portion formed on one end thereof. The valve assembly was then generally disposed between the flange portions of each connecter and, the connecters and the valve assembly were held in an assembled relationship by a plurality of bolts extending generally through the flange portions of each connecter, and generally around a portion of the valve body therebetween. Since the mating faces of the flange members and the valve body are flat, and, further, since it is virtually impossible to tighten the nuts on each bolt to the same degree, it has been found that a number of bolts will be placed in a greater tension than the remaining bolts. The result of the uneven tension being applied to the bolts, and thus the uneven tension applied to the respective connecters, has been that a poor seal is made between a portion of at least one of the connecters and the respective end of the valve body. This problem is, of course, compounded in valves when used in high pressure applications.

SUMMARY OF THE INVENTION

The present invention contemplates a valve assembly comprising: a valve body, having opposite end faces and a bore extending therethrough intersecting said end faces. A valve member is disposed in said bore. The valve assembly includes a pair of connecters which are oppositely disposed about the valve body. Each connecter is provided with opposite end faces and a bore extending therethrough. One end face of each connecter is adapted to abut the respective end face of the valve body. A clamping surface is formed around a portion of the outer periphery of each connecter and extends at an angle other than 90° therefrom. A flange ring is generally disposed around a portion of each connecter and has a clamping surface on the inner periphery thereof shaped to matingly engage the respective surface of respective connecter, such that each flange ring may be canted with respect to its respective connecter. The valve body, the pair of flange rings, and the pair of connecters are then held in assembled relationship by a plurality of bolts.

An object of the invention is to minimize the possibility of leakage between the valve body and connecters of a valve assembly held in an assembled relationship by a plurality of bolts.

A further object of the invention is to equalize the tension on the bolts used in a valve assembly held in an assembled relationship between a pair of connecters by the bolts.

A still further object of the invention is to provide a valve assembly for high pressure applications.

Another object of the invention is to provide a valve assembly held in an assembled relationship between a pair of oppositely disposed connecters which is economical in construction and operation.

Other objects and advantages of the invention will be evident from the following detailed description when read in conjunction with the accompanying drawings, which illustrate various embodiments of the invention

BRIEF DESCRIPTION OF THE DRAWING

FIG. 2 is a view similar to FIG. 1, but illustrating a modified valve assembly

DESCRIPTION OF THE PREFERRED EMBODIMENTS

Figure 1:
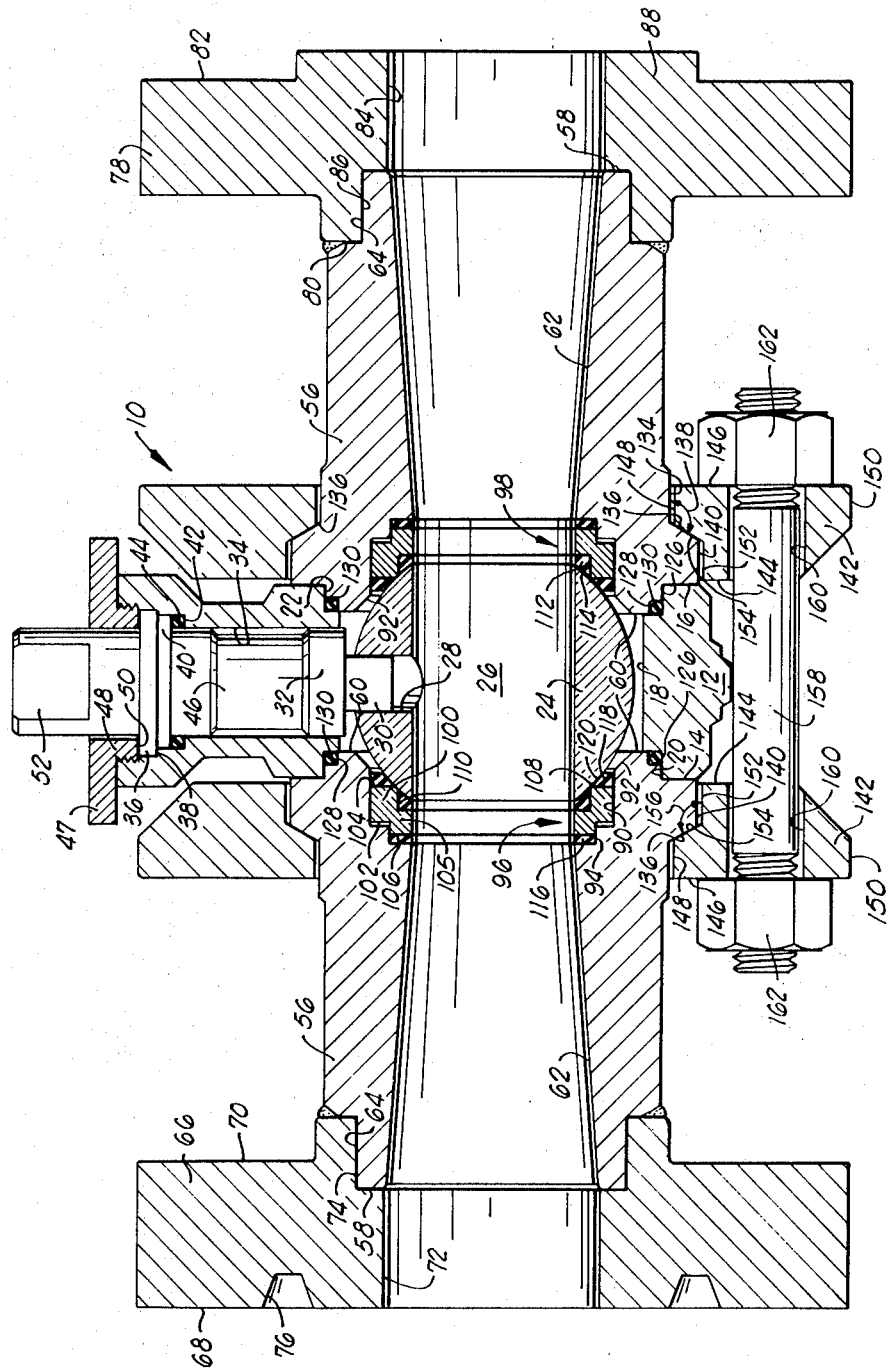
FIG. 1 is a sectional view of a valve assembly.

Referring to the drawings in detail, and in particular to FIG. 1, as shown therein and designated by the general reference character 10, is a valve which is constructed in accordance with the invention. The valve 10 includes a valve body 12 having opposite ends 14 and 16, and a bore 18 extending therethrough intersecting the opposite ends 14 and 16. A pair of counterbores 20 and 22 are formed in the valve body 12, adjacent the end faces 14 and 16, respectively.

A spherically shaped valve member, that is a valve ball 24, is movably disposed in the bore 18 of the valve body 12. Valve ball 24 is provided with a port 26 extending therethrough. The valve ball 24 has a rectangular recess 28 formed in the exterior surface thereof sized to receive a rectangular end 30 formed on the lowermost end portion of a valve stem 32. The recess 28 of the valve ball 24 is sized to be longer than the end 30 of the valve stem 32 to permit movement of the valve ball 24 in a direction parallel to the bore 18 of the valve body 12 when the valve ball 24 has been turned to a closed position. The valve stem 32 extends through, and is journaled in, an aperture 34 extending transversely through the body 12.

In addition to the rectangular end 30, the valve stem 32 includes a first exterior flange 36 positioned to engage an upwardly facing surface 38 formed in the valve body 12, encircling the aperture 34, to limit the downward movement of the valve stem 32 in the aperture 34. A second exterior flange 40 is also formed on the valve stem 32 adjacent the first exterior flange 36. In an assembled position, as shown in FIG. 1, the second exterior flange 40 is disposed a distance above an upwardly facing surface 42, formed in the valve body 12, and which also encircles the aperture 34 of the valve body 12. An O-ring seal 44 is disposed generally between the upwardly facing surface 42 of the valve body 12 and the second exterior flange 40 of the valve stem 32. In an assembled position, as shown in FIG. 1, the O-ring 44 will be generally compressed between the second exterior flange 40 and the upwardly facing surface 42, and thus will provide a fluidtight seal between the valve body 12 and the valve stem 32.

A grooved relief portion 46 is provided in the valve stem 32 to reduce the frictional contact between the valve stem 32 and the walls of the aperture 34.

A cap 47 is threadedly secured to the valve body 12, and is provided with a flanged portion 48 extending therefrom, thereby providing a generally downwardly facing surface 50 thereon. In an assembled position, as shown in FIG. 1, the downwardly facing surface 50 of the flange portion 48 is provided to engage the upwardly facing surface of the first exterior flange 36 of the valve stem 32, and will therefore limit the upward movement of the valve stem 32 in aperture 34.

The upper portion 52 of the first valve stem 32 is adapted to receive and cooperate with a valve handle, or other suitable operator (not shown) for turning the valve stem 32, and thereby rotating the valve member 24 from a fully open to a fully closed position, as will be described hereinafter. As well known in the art, various forms of valve handles and connections may be used. In one form, for example, the handle is connected to the upper portion 52 of the valve stem 32 by a pin, and includes a lug portion that is engageable with a pair of abutments on the valve body 12 to limit the rotational movement of the handle and the interconnected valve member to approximately 90°.

A pair of connecters 56, each having opposite ends 58 and 60, and a bore 62 extended therethrough, are oppositely disposed on the valve body 12, such that, in an assembled position as shown in FIG. 1, the end 60 of one of the connecters 56 will abut the wall in the valve body formed by the counterbore 20, and the end 60 of the opposite connecter 56 will abut the wall in the valve body 12 formed by the counterbore 22 therein, as will be described in greater detail hereinbelow. A groove 64 is formed around the outer periphery of each connecter 56 adjacent end 58 thereof.

The valve 10 includes a flange member 66, having opposite ends 68 and 70 and a bore 72 extending therethrough, which is secured to one of the connecters 56. A counterbore 74 is formed in the bore 72 from the end 70 of the flange member 66. The inner periphery formed by the counterbore 74 is sized to provide a sliding fit with the groove 64 formed in the outer periphery of the respective connecter 56. In an assembled position, as clearly shown in FIG. 1, the flange member 66 has been generally slid onto one of the connecters 56 to a position wherein the end 70 of the flange member 66 abuts the wall formed on the respective connecter 56 by the groove 64. In this position the bore 72 of the flange member 66 is in communication with the bore 62 of the respective connecter 56, and the flange member 66 is welded to the respective connecter 56.

As shown in FIG. 1, a groove 76 is formed in the end 68 of the flange member 66. The groove 76 is shaped to receive a portion of a ring type joint (not shown), and therefore, it is apparent that the flange member 66 shown in FIG. 1, is of the type generally known in the art as a ring-type joint flange member.

A flange member 78, having opposite ends 80 and 82 and a bore 84 extending therethrough, is secured to the opposite connecter 56. The flange member 78 is also provided with a counterbore 86, adjacent the end 80 thereof, which is similar to the counterbore 74 of the flange member 66, and has an inner periphery sized to sliding mate with the groove 64 of the respective connecter 56. In an assembled position, as shown in FIG. 1, the end 80 of the flange member 78 is provided to abut the wall formed by the groove 64 in the connecter 56, and in this position, the flange member 78 is welded to the respective connecter 56.

A raised portion 88 is provided on the end 82, around the bore 84 of the flange member 78. It is apparent that the flange member 78, described hereinabove, is of the type generally known in the art as a raised face flange.

It should be noted that, although each connecter 56 is shown in FIG. 1 as having a different type of flange member secured thereto, it is apparent that either type of flange member shown in FIG. 1 could be provided on both of the connecters 56. It is also apparent that other types of flange members could be used in lieu of flange members 66 and 78 shown in FIG. 1, or in the alternative, each connecter 56 could be provided with a threaded portion adapted to receive the threaded end of a conduit (not shown).

A first counterbore 90 is formed in each connecter 56 adjacent the end 60 thereof. A tapered portion 92 is provided between the first counterbore 90 and the end 60 of each connecter 56 to accommodate the valve member 24. A second counterbore 94 is formed in each connecter 56, adjacent the first counterbore 90 and the inner periphery of the second counterbore 94 has a diameter less than the diameter of the first counterbore 90.

The first and second counterbores 90 and 94 respectively, of each connecter 56 are provided to generally receive and cooperate with what may be generally referred to as an upstream or a downstream seat assembly 96 or 98 respectively. In a preferred form, the upstream and downstream seat assemblies 96 and 98 are identical in construction.

Each seat assembly 96 and 98 basically comprises a seat ring 100, having a nonvalve member end 102 and a valve member end 104. The outer periphery of each seat ring 100 is sized to provide a sliding fit in the respective counterbore 90. An axial flange portion 105, having a nonvalve member end 106, is formed on the nonvalve member end 102 of each seat ring 100, and extends generally axially into the respective second counterbore 94. The outer periphery of each flange portion 105 is sized to provide a sliding fit in the respective counterbore 94.

A seating surface 108, which in a preferred form is shaped to mate with the exterior surface of the valve member 24, is formed on the valve member end 104 of each seat ring 100. A groove 110 is formed in the seating surface 108 of each seat ring 100 in communication with the inner periphery of the seat ring. A resilient type seal member 112 is bonded in the groove 110 of each seat ring and has a valve member end surface 114 formed thereon shaped to sealingly mate with the exterior surface of the valve member 24. It is apparent from FIG. 1, that a portion of each seal member 112 will be exposed to the fluid pressure existing in the bore 62 of the respective connecter 56, for reasons which will be described in more detail hereinafter.

An elastomeric pad 116 is bonded to the nonvalve member end 106 of each flange portion 105 and is sized to engage the wall formed by the respective counterbore 94. A second elastomeric pad 118 is bonded to the valve member end 104 of each seat ring 100. Each pad 118 has a valve member end surface 120 shaped to sealingly mate with the exterior surface of the valve member 24, and is sized to sealingly contact the surface of the counterbore 90 of the respective connecter 56.

An annular groove 126 is formed around the outer periphery of each connecter 56, adjacent the end 60 thereof. The outer periphery of each groove 126 is sized to matingly and slidingly fit the respective counterbore 20 or 22 of the valve body 12, and therefore, in an assembled position as shown in FIG. 1, the end wall formed by the groove 126 of each connecter 56 will abut the respective end 14 or 16 of the valve body 12. A second annular groove 128 is formed in each connecter 56 between the end 60 and the respective groove 126. An O-ring seal member 130 is disposed in each groove 128 and is sized to provide a fluid type seal between the valve body 12 and each connecter 56.

A groove 134 is formed around a portion of the outer periphery of each connecter 56 in such a manner as to provide a tapered clamping surface 136, which generally extends around a portion of the outer periphery of each connecter 56. In a preferred form, and as shown in FIG. 1, the tapered surface 136 is provided to form an obtuse angle 138 with respect to the cylindrical wall formed by the groove 134, and further in preferred form, the angle 138 is provided to be approximately 135°, for reasons which will be made more apparent hereinafter. The tapered surface 136 extends generally radially outwardly from each connecter 56 at an angle, as described hereinbefore, and intersects an outer cylindrical surface 140 formed on the respective connecter 56.

The valve 10 also includes a pair of flange rings 142 which are oppositely disposed about the connecters 56. Each flange ring 142 includes opposite end faces 144 and 146, an inner periphery 148, and an outer periphery 150. Each flange ring 142 also is provided with an annular groove 152, formed in the inner periphery 148 thereof, adjacent the respective end face 144. Each groove 152 is shaped to provide a tapered clamping surface 154 extending around the inner periphery of each flange ring 142. Each tapered surface 154 is shaped to mate with the respective tapered surface 136 formed on the respective connecter 56, and, more particularly, is provided to form an obtuse angle 156 with respect to the groove 152, as clearly shown in FIG. 1.

The diameter of the inner periphery 148, and the diameter of the groove 152 of each flange ring 142, are greater than the respective diameters of the groove 134 and the outer surface 140 of each connecter 56, for reasons which will become more apparent hereinafter.

A plurality of bolts 158 extend through mating apertures 160 in the flange rings 142. The bolts 158 are each provided with a pair of nuts 162 secured on the opposite ends thereof and generally abutting the end faces 146 of the flange rings 142, thereby securing the valve 10 in an assembled position, as shown in FIG. 1.

OPERATION OF FIGURES 1 AND 2

To assemble the valve assembly 10, as shown in FIG. 1, the O-ring 44 is first disposed in the aperture 34 adjacent the upwardly facing surface 42 therein, and the valve stem 32 is inserted in a generally downward direction through the aperture 34. The cap 47 is then threadedly secured in position, such that the downwardly facing surface 50 of the cap 47 engages the first exterior flange 36 of the valve stem 32, thereby holding the valve stem 32 in position with respect to the valve body 12.

The valve stem 32 is then turned to a position wherein the rectangular end 30 thereof is axially alined with the bore 18 of the valve body 12. The valve member, or valve ball 24 is then positioned in the bore 18 of the valve body 12 in a position such that the rectangular end 30 of the first valve stem 32 is generally disposed in the rectangular recess 28 of the valve ball 24.

Each seat assembly 96 and 98 is then positioned in the respective counterbores 90 and 94 of the connecters 56, and the O-rings 130 are positioned in the respective grooves 128 of the connecters 56. Each connecter 56 is then moved into a generally assembled relationship with respect to the valve body 12. In this position, and as shown in FIG. 1, the end 60 of each connecter 56 will abut the wall formed by the respective counterbore 20 or 22 in the valve body 12, and the surface of the groove 126 of each connecter 56 will be in engagement with the respective counterbore 20 or 22 of the valve body 12. It is also apparent from FIG. 1 that in this position, the wall formed by the groove 126 of each connecter 56 will abut the respective end face 14 or 16 of the valve body 12.

Each flange 7 is then disposed about its respective connecter 56, in a position wherein the tapered surface 154 of each flange ring 142 is in engagement with the tapered surface 136 provided on the respective connecter 56. Since the diameters formed by the inner periphery 148 and the groove 152 of each flange ring 142 are greater than the respective diameters formed by the groove 134 and the outer surface 140 of each connecter 56, it is apparent that each flange ring 142 may cant or tilt along the adjacent tapered portions 136 and 154 with respect to the respective connecter 56.

The bolts 158 are then extended through the flange rings 142, and of course are generally disposed in the apertures 160 provided therein. The nuts 162 are then threadedly secured to the ends of the bolts 158. As the nuts 162 are tightened, the valve body 12, each connecter 56, and each flange ring 140 are brought securely into an assembled relationship, as shown in FIG. 1.

Since it is virtually impossible to tighten a plurality of bolts with the same degree of force being applied at all points with respect each connecting flange member, the flange rings 142 will cant with respect to the connecters 56 and thus compensate for the varying degrees of force being applied to each flange ring 142 by the bolts 158 and the nuts 162. It is also apparent that by using this type of connection, the force which is transmitted to each connecter 56 will remain substantially constant about the outer periphery thereof. The canting or tilting of the flange rings 142 is particularly important in those applications involving high pressures because the high pressure tends to amplify the distortion caused by the uneven tightening of the bolts 158.

As shown in FIG. 1, the valve member 24 has been rotated to an open position where the port 26 therethrough is substantially alined with the bores 62 of the connecters 56, thereby providing a passageway through the valve assembly 10. When the valve member 24 is turned to a closed position by turning the valve stem 32, the valve member 24 will be free to move downstream with respect to the valve stem 32, in the event a differential pressure is applied across the valve.

Assuming that a pressure does exist in one of the openings provided by the bore 62 of one of the connecters 56, the valve member 24 will be moved in a downstream direction, and the exterior surface thereof will engage the seating surface 108 provided on the seat ring 100 of the downstream seat assembly 98. Since each of the seat assemblies 96 and 98 is slidingly disposed in the respective counterbore 90 or 94 of the respective connecter 56, the downstream seat assembly 98 will move downstream following the direction of the valve member 24.

The downstream seat assembly 98 and the valve member 24 will continue to move in a generally downstream direction until the nonvalve member end 102 of the seat ring 100 engages the annular wall formed by the respective counterbore 94. In this position the valve member 24 will be supported by the seat ring 100 of the downstream seat assembly 98. It will also be noted as the valve member 24 moves, the exterior surface thereof will engage and deform the valve member end surfaces 114 and 120 of the seal member 112 and the elastomeric pad 118 respectively, thereby forming a fluid tight seal therebetween.

Since a portion of the elastomeric pad 118 of the downstream seat assembly 98 is exposed to the pressure existing in the valve chamber formed by the bore 18, this pressure will augment the sealing effectiveness between the surface 120 of the elastomeric pad 118 and the exterior surface of the valve member 24. The elastomeric pad 118 of the downstream seat assembly 98 is also in engagement with the surface formed by the counterbore 90 of the respective connecter 56 and thus will form a fluid tight seal therebetween, which is also augmented by the pressure existing in the valve chamber.

When the valve member 24 is rotated closed position described hereinabove, the upstream seat assembly 96 will also move in a downstream direction generally following the movement of the valve ball 24. The upstream seat assembly 96 will eventually come to rest in a position wherein the seating surface 108 thereof is engagement with the exterior surface of the valve member 24. In this position, the valve member end surface 114 of the elastomeric seal member 112 will sealingly engage the valve member 24. Since a portion of the elastomeric seal member 112 is exposed to the upstream pressure existing in the respective connecter 56, it is apparent that this pressure will compress the seal member 112 generally toward the valve member 24, and will thus augment the sealing effectiveness between the seal member 112 and the exterior surface of the valve member 24. As described hereinbefore, since a portion of the elastomeric pad 116 is also exposed to the upstream pressure existing in the respective connecter 56, this pressure will compress the elastomeric pad 116 generally toward the respective connecter 56, and will thus augment the sealing effectiveness between the elastomeric pad 116 and the walls of the respective connecter 56 formed by the counterbore 94 therein, thereby providing a fluid tight seal therebetween.

It is apparent that the seat assembly described hereinabove provides a single structure which may be used effectively as an upstream or downstream seal, and one where the sealing effectiveness is pressure augmented.

It is apparent from the foregoing that the present invention provides a valve which is held in an assembled position between a pair of connecters by a pair of flange rings, wherein the contacting surfaces between the flange rings and the respective connecters are provided to allow a canting or tilting movement of the flange rings with respect to the connecters. Therefore, when the valve is bolted into an assembled relationship, the uneven pressure or tightening force which is applied to each bolt is compensated by the tilting or canting movement of each flange ring, and the seals between the connecters and the valve body will not be affected. It should also be apparent that, since the flange rings are not constructed integrally with the connecters, the flange rings as described with respect to the present invention will be more flexible and will therefore bend slightly to accommodate for the uneven tightening of the bolts without incurring any permanent deformation.

EMBODIMENT OF FIGURE 2

Another embodiment of a valve assembly which is constructed in accordance with the invention is shown in FIG. 2 and designated by the general reference character 10a. The valve assembly 10a is constructed similar to the valve assembly 10, shown in FIG. 1, and only the modified parts will be described.

Valve assembly 10a includes a pair of connecters 170 and 172 positioned on opposite ends of the valve body 12. The connecter 170 is provided with opposite ends 174 and 176, and a bore 178, which extends therethrough intersecting the opposite ends 174 and 176. A portion of the bore 178, generally adjacent the outer end 176, is provided with a threaded portion 180, which is sized to receive the threaded end of a connecter (not shown).

The connecter 172 is provided with opposite ends 182 and 184 and a bore 186 extending therethrough, intersecting the opposite ends 182 and 184. The outer end 184 of the connecter 172 is adapted to be welded to a pipe (not shown). The connecter 172 is also provided with a plurality of fins 188 formed around a portion of the outer periphery thereof. The purpose of the fins 188 is to radiate the heat, which results when the end 184 of the connecter 172 is welded to the respective end of a pipe (not shown), and thereby protect the seal members and the seat assemblies of the valve assembly 10a from damage due to excessive exposure to heat, as a result of the above welding.

A counterbore 190 is formed in the inner end of each connecter 170 and 172. A tapered portion 192 is provided between each counterbore 190 and the inner end of the respective connecter 170 or 172, to accommodate the valve member 24. A second counterbore 194 is formed in each connecter 170 and 172, adjacent the first counterbore 190 therein, and a diameter less than the diameter of the first counterbore 190.

The first and second counterbores 190 and 194 are provided to generally receive and cooperate with what may be referred to as an upstream and a downstream seat assembly 196 and 198, respectively. In a preferred form, the upstream and downstream seat assemblies 196 and 198 are identical in construction.

Each seat assembly 196 and 198 basically comprises a seat ring 200, which in a preferred form is constructed of a metal, having a valve member end 202 and a nonvalve member end 204. Each valve member end 202 is shaped to seatingly mate the exterior surface of the valve member 24. A pair of flange portions 206 and 208, axially spaced, are provided on each seat ring 200 and extend in a generally outward radial direction therefrom, for reasons which will be more apparent hereinafter. The flange portion 208 of each seat ring 200 has an outer periphery sized to slidingly mate with the second counterbore 194 of the respective connecter 170 or 172.

A seal member 210, which in a preferred form is constructed of a reinforced plastic, is generally disposed around and bonded to each seat ring 200. The outer periphery of each seal member 210 is sized to slidingly fit in the first counterbore 190 of the respective connecter 170 or 172. Each seal member 210 is provided with a valve member end 212 and a nonvalve member end 214. A seating surface 216 is formed on the valve member end 212 of each seal member 210, and is shaped to sealingly mate with the exterior surface of the valve ball 24. A plurality of annular grooves 218 are formed in the surface 216 of each seal member 210.

A flange portion 220 is provided on each seal member 210 generally adjacent the nonvalve member end 214 thereof, and extends generally in an axial direction therefrom. The outer periphery of each flange portion 220 is sized to slidingly fit in the second counterbore 194 of the respective connecter 170 or 172, and the nonvalve member end 222 of each flange portion 220 is sized to abut the flange portion 208 of the respective seat ring 200.

A notch 224 is formed in the inner periphery of each seal member 210 and is sized such that in an assembled position, the flange portion 206 of the respective seat ring 200 is securely disposed therein. It is apparent from FIG. 2, that the flange portions 206 and 208 of each seat ring 200 generally retain the respective seal member 210, and prevent the seal member 210 from moving axially with respect to the seat ring 200.

A groove 230 is formed around the outer periphery of each connecter 170 and 172, adjacent the inner ends thereof. The outer periphery of each groove 230 is sized to matingly and slidingly fit in the respective counterbore 20 or 22 of the valve body 12, and therefore in an assembled position the wall formed by the groove 230 of each connecter 170 and 172 will abut the respective end 14 or 16 of the valve body 12. A second smaller diameter groove 232 is formed in the inner end of each connecter 170 and 172, thereby providing a gap between the groove 230 and the respective counterbore 20 or 22 in the valve body 12, when the valve 10a is in an assembled position. An O-ring seal member 234 is disposed in each gap between the groove 232 and the respective counterbore 20 or 22 in the valve body 12, and is sized to provide a sealing fit therein, thereby providing a fluid tight seal between the valve body 12 and each connecter 170 and 172.

A groove 238 is formed around a portion of the outer periphery of each connecter 170 and 172. As clearly shown in FIG. 2, the groove 238 is formed in such a manner as to provide a curved clamping surface 240, which extends generally around a portion of the outer periphery of each connecter 170 and 172 respectively. In a preferred form, the curved surface 240 is formed on a radius 242. The dimensions of the radius 242 will depend on a particular size of valve assembly 10a, and in particular the radius 242 should be of a sufficient size to retain the flange rings in an axial direction and, yet provide a canting or tilting movement of the flange rings with respect to each connecter 170 and 172, as will be described in more detail hereinafter. The radius 242 extends generally radially outwardly from each connecter 170 and 172, and intersects and outer surface 244 formed on the respective connecter 170 or 172.

The valve assembly 10a also includes a pair of flange rings 246 positioned around the connecters 170 and 172. Each flange ring 246 includes opposite end faces 248 and 250, an inner periphery 252, and an outer periphery 254. Each flange ring 246 is also provided with a groove 256 formed in the inner periphery 252 thereof, adjacent the respective end face 250. The groove 256 is shaped to provide a curved clamping surface 258 extending around a portion of the inner periphery of each flange ring 246. The curved surface 258 is shaped to mate with the respective curved surface 240 formed on the respective connecter 170 or 172.

The diameter formed by the inner periphery 252 and the diameter formed by the groove 256 of each flange ring 246, are greater than the respective diameters formed by the groove 238 and the outer surface 244 of the respective connecter 170 or 172.

A plurality of bolts 260 are provided extending through each flange ring 246, each flange ring 246 having a plurality of apertures 262 provided therethrough to accommodate the bolts 260. The bolts 260 are each provided with nuts 264 secured on the opposite ends thereof, and generally abutting each end face 250 of each flange ring 246, thereby securing the valve 10a in an assembled position as shown in FIG. 2.

OPERATION OF FIG. 2

The valve assembly 10a will operate generally similar to the valve assembly 10 shown in FIG. 1. The valve body 12, of the valve member 24, and the valve stem 32 of the valve assembly 10a, are secured in an assembled relationship with respect to each other exactly as described with respect to the valve assembly 10 shown in FIG. 1.

The upstream and downstream seat assemblies 196 and 198 are then generally disposed in the counterbores 190 and 194 of the respective connecters 170 and 172, and the O-rings 234 are placed in the grooves 232 of the connecters 170 and 172. Each connecter 170 and 172 is then moved into a generally assembled relationship with respect to the valve body 12, In this position, the inner end 174 and the wall formed by the groove 230 of the connecter 170 will abut the wall formed by the counterbore 22 and the end 16 of the valve body 12. It is also apparent from FIG. 2, that in this position, the surface formed by the groove 230 of the connecter 170 will be in engagement with the surface formed by the counterbore 22 of the valve body 12.

It is also apparent that, in the assembled position as shown in FIG. 2, the end 182 and the wall formed by the groove 230 of the connecter 172 will abut the wall formed by the counterbore 20 in the end 14 of the valve body 12. In this position the surface formed by the groove 230 of the connecter 172 will also be in engagement with the surface formed by the counterbore 20 of the valve body 12.

One of the flange rings 246 is then generally disposed about the connecter 170, and the other flange ring 246 is generally oppositely disposed about the connecter 172. Each flange ring 246 is then positioned about the respective connecter 170 and 172 such that the curved surface 258 of each flange ring 246 is in engagement with the curved surface 240 of the respective connecter 170 or 172.

Since the diameter formed by the outer periphery 252 and the groove 256 of each flange ring 246 is greater than the respective diameters formed by the groove 238 and the outer surface 244 of the respective connecter 170 or 172, it is apparent that each flange ring 246 may cant or tilt along the adjacent curved portions 240 and 258, with respect to the connecters 170 and 172.

The bolts 260 are then extended through each flange ring 246, and of course are generally disposed in the apertures 262 provided therein. The nuts 264 are then threadedly secured to each end of each bolt 260. As the nuts 264 tighten, the valve body, the connecters 170 and 172, and the flange rings 246 are brought securely into an assembled relationship, as shown in FIG. 2.

It is apparent that the valve assembly 10a is secured in an assembled relationship such that the uneven tightening of the bolts 260 is compensated by the canting or tilting of each flange ring 246 about the respective connecter 170 or 172, in a manner similar to the valve assembly 10 shown in FIG. 1. Thus, the connecters 170 and 172 are held in alinement with the valve body 12 and an even seal will be maintained around the entire inner end of each connecter and to respective end of the valve body. The main difference with respect to the canting or tilting of the flange rings between the valve assembly 10, shown in FIG. 1, and the valve assembly 10a shown in FIG. 2, is that the flange rings 246 of the valve assembly 10a cant or tilt about mating curved surfaces 240 and 258 provided on the flange ring 246 and the connecter 170 and 172 respectively, whereas the flange rings 142 of the valve assembly 10 cant or tilt about the mating tapered surfaces 154 and 136 of the flange rings 142 and each connecter 56 respectively.

When the valve member 24 of the valve assembly 10a is turned to a closed position by turning the valve stem 32, the valve member 24 will be free to move downstream with respect to the valve stem 32, in a manner similar to that described with respect to the valve assembly 10 shown in FIG. 1. As the valve member 24 moves in a downstream direction, the exterior surface thereof will engage the seating surface 202 of the downstream seat assembly 198. Since the downstream seat assembly 198 is slidingly disposed in the counterbores 190 and 194 of the connecter 170, the downstream seat assembly 198 will move in a generally downstream direction following the movement of the valve member 24.

The downstream seat assembly 198 and the valve member 24 will continue to move a generally downstream direction until the nonvalve member end 204 of the seat ring 200 engages the annular wall formed by the counterbore 194 in the connecter 170. In this position the valve member 24 will be supported by the seat ring 200 of the downstream seat assembly 198. It is also apparent that as the valve member 24 moves, the exterior surface thereof will engage and deform the valve member end surface 216 of the seal member 210, thereby forming a fluid tight seal therebetween. In this position the nonvalve member end 214 and the outer periphery of the seal member 210 will be in sealing engagement with the wall formed by the counterbore 190, thereby forming a fluid tight seal therebetween.

The upstream seat assembly 196 will also move in a generally downstream direction following the movement of the valve member 24, and eventually come to rest in a position wherein the seating surface 202 and the surface 216 of the seat ring 200 and the seal member 210, respectively, will engage the exterior surface of the valve member 24. Although some sealing will be effected by the upstream seat assembly 196 with respect to the valve member 24, it is apparent that the downstream seat assembly 198 will be the primary sealing member.

Changes may be made in the construction and arrangement of parts or elements of the various embodiments as disclosed herein without departing from the spirit and scope of the invention as described in this specification.

I claim:

1. A valve assembly comprising:
   a valve body having opposite end faces and a bore extending therethrough intersecting said end faces;
   a valve member disposed in said bore;
   a pair of connecters, each connecter having opposite end faces and a bore extending therethrough, one end face of each connecter being adapted to abut the respective end face of the valve body, and each connecter having a clamping surface formed around a portion of the outer periphery thereof extending at an angle other than ninety degrees therefrom;
   a flange ring encircling each connecter, each flange ring having a clamping surface formed around a portion of the inner periphery thereof shaped to matingly engage the clamping surface of the respective connecter, such that each flange ring may cant with respect to the respective connecter; and
   a plurality of bolts extending through each flange ring, thereby holding the valve assembly in an assembled relationship.

2. The valve assembly of claim 1 wherein each connecter is adapted to sealingly engage the respective end face of the valve body.

3. The valve assembly of claim 1 further characterized to include an O-ring seal member disposed between each connecter and the respective end face of the valve body, thereby forming a fluid tight seal therebetween.

4. The valve assembly of claim 1 wherein the outer diameters of each connecter, on the opposite sides of the respective clamping surface, are less than the inner diameters of the opposed portions of the respective flange ring.

5. The valve assembly of claim 1 wherein each clamping surface has a substantially flat cross section.

6. The valve assembly of claim 5 wherein each clamping surface is tapered outwardly and toward the respective end of the valve body.

7. The valve assembly of claim 1 wherein each clamping surface has a substantially curved cross section.

8. The valve assembly of claim 7 wherein each curved clamping surface has a generally convex-shaped cross section with respect to the respective connecter.

9. The valve assembly of claim 1 wherein the valve member is spherical in shape.

10. The valve assembly of claim 1 wherein the end of one of the connecters, opposite the end which abuts the valve body, is adapted to be welded to a pipe.

11. The valve assembly of claim 10 wherein the connecter adapted to be welded to a pipe is defined further to include a plurality of fins formed around the outer periphery thereof, and extending generally radially therefrom.

12. The valve assembly of claim 1 wherein a portion of the inner periphery of the end of one of the connecters, opposite the end which abuts the valve body, is provided with a threaded portion adapted to receive the threaded end of a conduit.

13. The valve assembly of claim 1 defined further to include a flange member secured to the end of one of the connecters opposite the end which abuts the valve body.

14. The valve assembly of claim 13 wherein the flange member is a ring joint type flange member.

15. The valve assembly of claim 14 wherein the flange member is a raised-face type flange member.

16. The valve assembly of claim 1 defined further to include a seat assembly disposed in the end of one of the connecters adjacent the valve body.

17. The valve assembly of claim 1 defined further to include a seat assembly in the end of each connecter adjacent the valve body.

18. The valve assembly of claim 17 wherein each seat assembly includes:
   a seat ring of relatively inflexible material, having a valve member end and a nonvalve member end, and a seating surface formed on the valve member end thereof; and
   a seal means disposed in the seating surface of said seat ring, having a portion thereof exposed to the pressure existing in the respective bore of the respective connecter and having a surface formed thereon sized to sealingly engage the exterior surface of the valve member.

19. The valve assembly of claim 18 wherein the seat assembly is defined further to include an elastomeric pad bonded to the valve member end of the seat ring, sized to sealingly engage the respective connecter, and having a surface formed thereon sized to sealingly engage the exterior surface of the valve member.

20. The valve assembly of claim 19 wherein the seat assembly is defined further to include a flange portion extending generally axially from said nonvalve member end of said seat ring, and an elastomeric pad bonded to the nonvalve member end of said flange portion, said elastomeric pad sized to sealingly engage the respective connecter, and a portion of said elastomeric pad being exposed to the pressure existing in the bore of the respective connecter.

21. The valve assembly of claim 17 wherein each seat assembly includes:
   a seat ring of relatively rigid material slidingly disposed in the respective connecter, having a valve member end and a nonvalve member end, said valve member end having a seating surface formed thereon; and
   a seal member secured to said seat ring, having a surface formed on the valve member end thereof, sized to sealingly engage the valve member, said seal member slidingly disposed with respect to the respective connecter.

22. The valve assembly of claim 21 wherein the seal member includes a plurality of grooves formed in the seating surface thereof.

23. The valve assembly of claim 22 wherein the seal member is bonded to the seat ring.